United States Patent
Ishikawa

(10) Patent No.: US 11,283,129 B2
(45) Date of Patent: Mar. 22, 2022

(54) STACK FRAME

(71) Applicant: TOYOTA JIDOSHA KABUSHIKI KAISHA, Toyota (JP)

(72) Inventor: Daisuke Ishikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 318 days.

(21) Appl. No.: 16/671,245

(22) Filed: Nov. 1, 2019

(65) Prior Publication Data

US 2020/0185674 A1 Jun. 11, 2020

(30) Foreign Application Priority Data

Dec. 11, 2018 (JP) .............................. JP2018-231651

(51) Int. Cl.
 *B60K 1/04* (2019.01)
 *H01M 50/20* (2021.01)
 *H01M 50/169* (2021.01)

(52) U.S. Cl.
 CPC .............. *H01M 50/20* (2021.01); *B60K 1/04* (2013.01); *H01M 50/169* (2021.01)

(58) Field of Classification Search
 CPC ................................. H01M 50/20; B60K 1/04
 See application file for complete search history.

(56) References Cited

U.S. PATENT DOCUMENTS

| 5,662,184 A * | 9/1997 | Riemer | B60K 11/00 180/65.1 |
|---|---|---|---|
| 6,223,843 B1 * | 5/2001 | O'Connell | F02B 43/10 180/65.22 |
| 6,494,286 B2 * | 12/2002 | Shimizu | B60K 1/00 180/299 |
| 6,598,691 B2 * | 7/2003 | Mita | B60L 50/66 180/65.1 |
| 7,886,861 B2 * | 2/2011 | Nozaki | B60K 5/1216 180/232 |
| 8,177,003 B2 * | 5/2012 | Shiomi | B60K 1/04 180/65.1 |
| 8,616,319 B2 * | 12/2013 | Yokoyama | B60K 1/04 180/68.5 |
| 8,789,634 B2 * | 7/2014 | Nitawaki | B60K 1/04 180/68.5 |
| 9,132,735 B2 * | 9/2015 | Black | B60L 7/10 |
| 2017/0232829 A1 * | 8/2017 | Nishikawa | B60K 1/04 180/68.5 |

FOREIGN PATENT DOCUMENTS

JP 2017-144859 A 8/2017

* cited by examiner

*Primary Examiner* — Jonathan Ng
*Assistant Examiner* — James J Triggs
(74) *Attorney, Agent, or Firm* — Dickinson Wright, PLLC

(57) ABSTRACT

The disclosure provides a stack frame that is arranged in a front portion of a vehicle and on which a battery stack is mounted. The stack frame includes a body section and a crash box. The body section includes plural members that are welded to each other along a weld line. The weld line between the plural members extends in a front-back direction of the vehicle. The crash box is arranged on a front side of the body section. A lateral wall surface of the crash box is displaced from an extended line of the weld line.

3 Claims, 5 Drawing Sheets

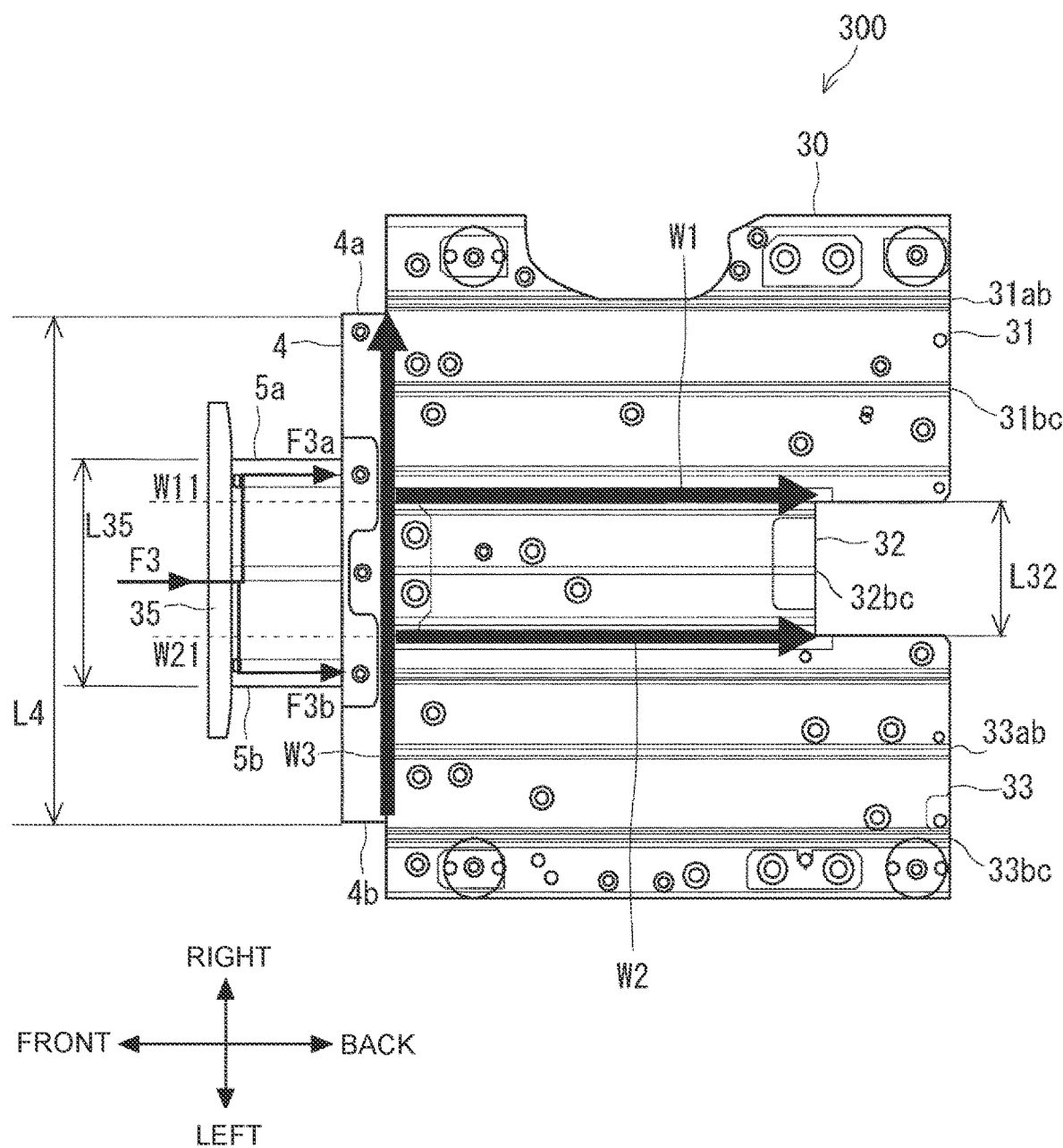

STACK FRAME

INCORPORATION BY REFERENCE

The disclosure of Japanese Patent Application No. 2018-231651 filed on Dec. 11, 2018 including the specification, drawings and abstract is incorporated herein by reference in its entirety.

BACKGROUND

1. Technical Field

The disclosure relates to a stack frame and, in particular, to a stack frame that is formed by joining plural members.

2. Description of Related Art

A stack frame that accommodates a battery stack is disclosed in Japanese Patent Application Publication No. 2017-144859 (JP 2017-144859 A). While accommodating the battery stack, the stack frame is mounted on an engine compartment that is arranged in a front portion of a vehicle.

SUMMARY

The inventors of the present application have found the following problem in the above-described technique.

A joint section, for which a method for joining plural members to form the stack frame is available, tends to have less impact durability than bodies of the plural members. Thus, in the case where the vehicle is involved in a collision and receives a significant impact, the joint section is possibly damaged.

The disclosure provides a stack frame with superior impact durability.

A stack frame according to the disclosure is a stack frame that is arranged in a front portion of a vehicle and on which a battery stack is mounted, and includes: a body section; and a crash box. The body section includes plural members that are welded to each other along a weld line. The weld line between the plural members extends in a front-back direction of the vehicle. The crash box is arranged on a front side of the body section, and a lateral wall surface of the crash box is displaced from an extended line of the weld line.

According to such a configuration, after the front portion of the vehicle, in which the stack frame is arranged, is involved in a collision and the crash box is crashed, a load by the collision is transferred as is to portions of the members except for the weld line. That is, this load is not transferred as is to the weld line. Thus, it is possible to suppress generation of damage to a joint section. Therefore, the stack frame has superior impact durability.

At least one of the plural members of the body section may include: plural hollow sections, each of which extends in the front-back direction of the vehicle; and a rib that separates the plural hollow sections and extends in the front-back direction of the vehicle. The lateral wall surface of the crash box may be provided on an extended line of the rib.

According to such a configuration, after the front portion of the vehicle, in which the stack frame is arranged, is involved in the collision and the crash box is crashed, the load by the collision is transferred to the rib of the hollow sections of the members in the body section. Thus, the rib supports this load. Therefore, the stack frame has the superior impact durability.

The stack frame further includes a cross member that is arranged between the body section and the crash box. A width of the cross member may be greater than a distance between the adjacent weld lines and a width of the crash box.

According to such a configuration, after the front portion of the vehicle, in which the stack frame is arranged, is involved in the collision and the crash box is crashed, the load by the collision is transferred to the body section via the cross member. That is, this load is not transferred as is to the weld line. Thus, it is possible to suppress the generation of the damage to the joint section. Therefore, the stack frame has the superior impact durability.

The disclosure can provide the stack frame with the superior impact durability.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a top view of another modified embodiment of the stack frame according to the first embodiment.

DETAILED DESCRIPTION OF EMBODIMENTS

A detailed description will hereinafter be made on a specific embodiment, to which the disclosure is applied, with reference to the drawings. It should be noted that the disclosure is not limited to the following embodiment. In addition, for a purpose of clarifying the description, the following description and the drawings will appropriately be simplified.

First Embodiment

Figure 1:
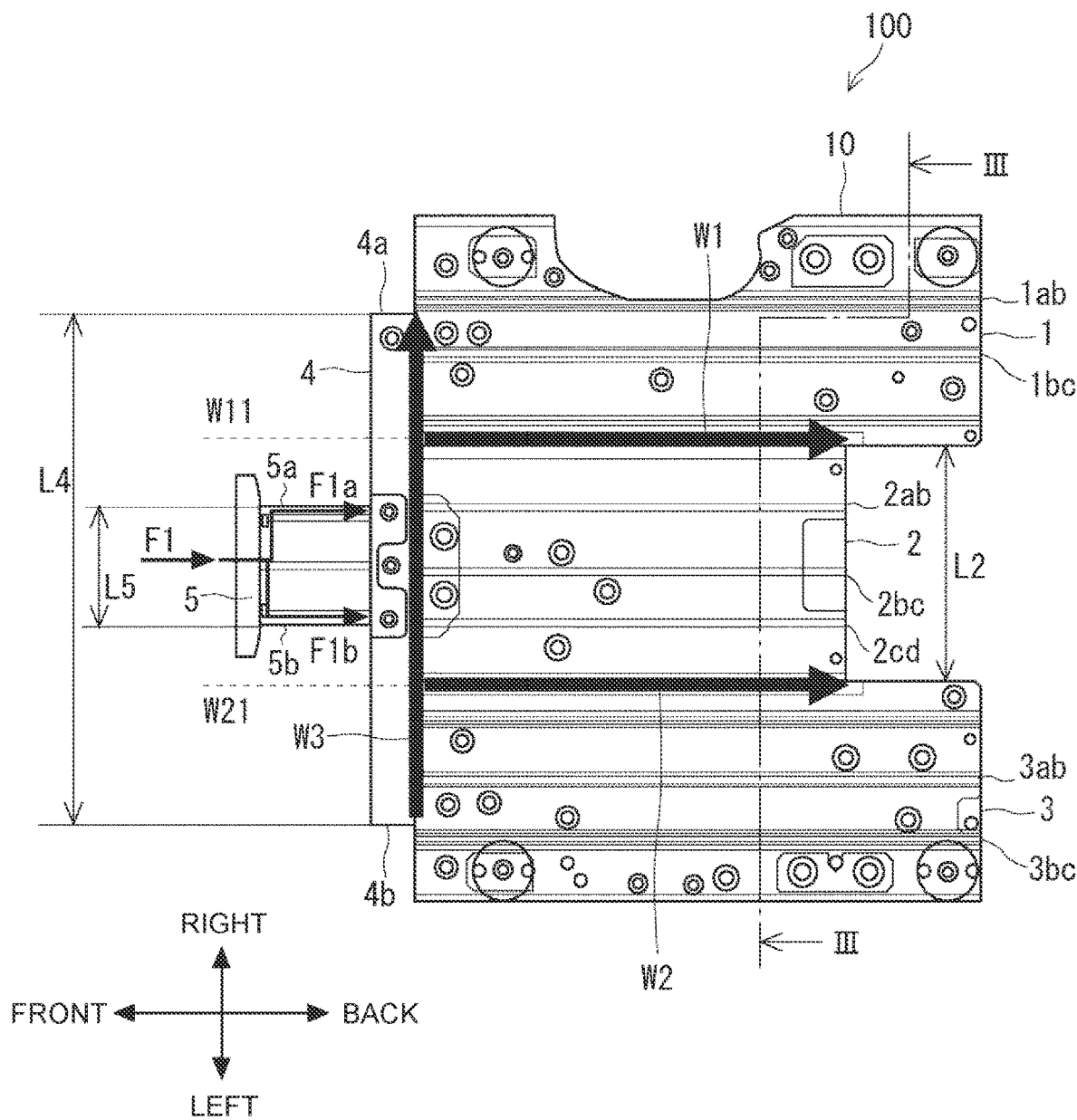
FIG. 1 is a top view of a stack frame according to a first embodiment.
Figure 2:
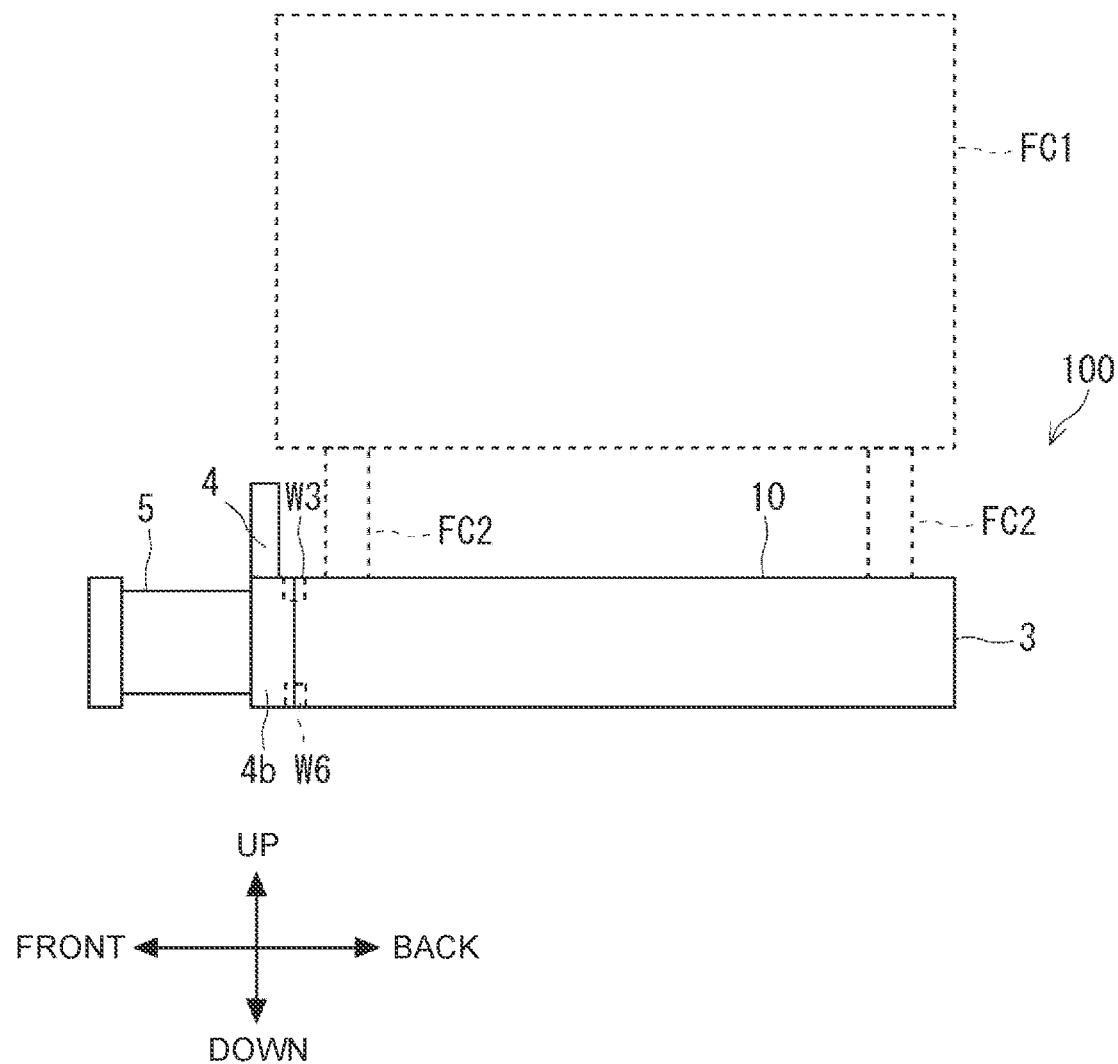
FIG. 2 is a left-side view of the stack frame according to the first embodiment.
Figure 3:
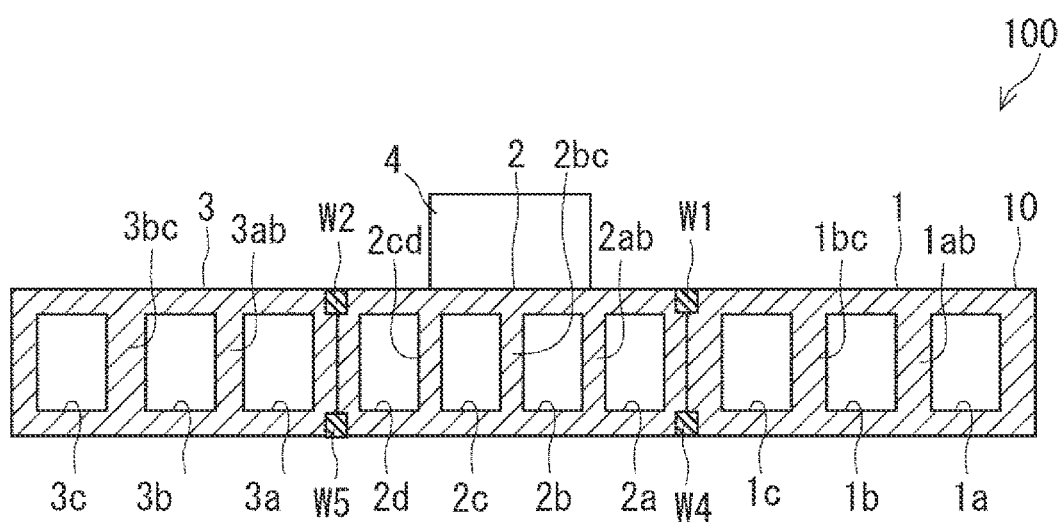
FIG. 3 is a cross-sectional view of the stack frame according to the first embodiment.

A description will be made on a stack frame according to a first embodiment with reference to FIG. 1 to FIG. 3. FIG. 1 is a top view of the stack frame according to the first embodiment. FIG. 2 is a left-side view of the stack frame according to the first embodiment. FIG. 3 is a cross-sectional view of the stack frame according to the first embodiment.

It is needless to say that three-dimensional rectangular coordinates illustrated in FIG. 1 and the other drawings indicate an up-down direction, a right-left direction, and a front-back direction, and are provided to conveniently illustrate positional relationships among components. FIG. 1 is a view in which a stack frame 100 is seen from above. FIG. 2 is a view in which the stack frame 100 is seen from a left side thereof. FIG. 3 illustrates a cross section of the stack frame 100 illustrated in FIG. 1.

The stack frame 100 is arranged in a front portion of a vehicle (not illustrated), more specifically, an engine compartment. The up-down direction, the right-left direction, and the front-back direction in FIG. 1 and the other drawings respectively correspond to an up-down direction, a right-left direction, and a front-back direction of the vehicle.

As illustrated in FIG. 1, the stack frame 100 includes a body section 10 and a crash box 5.

As illustrated in FIG. 2, a fuel cell stack FC1 can be mounted on the body section 10 via a support section FC2. The four support sections FC2 are preferably arranged on the body section 10. More specifically, the one support section FC2 is preferably arranged at each of four corners of the body section 10. Note that a cell stack of a secondary battery can be mounted on the body section 10 via the support section FC2. The secondary battery is a lithium-ion battery or the like, for example.

The body section 10 includes a right member 1, a center member 2, and a left member 3. The right member 1, the center member 2, and the left member 3 are arranged in this order from a right side to the left side. The center member 2 is held between the right member 1 and the left member 3. Each of the right member 1, the center member 2, and the left member 3 only has to be a plate-shaped member, and is specifically an extrusion member that is made of an aluminum alloy. As illustrated in FIG. 1 and FIG. 3, the right member 1 and the center member 2 are joined to each other along weld lines W1, W4, and the center member 2 and the left member 3 are joined along weld lines W2, W5 by friction stir welding (FSW). The weld lines W1, W2 of one example illustrated in FIG. 1 are adjacent to each other.

Any of a wide variety of joint methods can be used to join the right member 1 and the center member 2 and to join the center member 2 and the left member 3. Examples of other joint methods are welding methods such as laser welding and arc welding.

As illustrated in FIG. 3, the right member 1 has hollow sections 1a, 1b, 1c extending in the front-back direction and ribs 1ab, 1bc. The hollow sections 1a, 1b, 1c are arranged from the right side to the left side. The rib 1ab separates the hollow section 1a and the hollow section 1b. The rib 1bc separates the hollow section 1b and the hollow section 1c.

The center member 2 has hollow sections 2a, 2b, 2c, 2d extending in the front-back direction and ribs 2ab, 2bc, 2cd. The hollow sections 2a, 2b, 2c, 2d are arranged from the right side to the left side. The rib 2ab separates the hollow section 2a and the hollow section 2b. The rib 2bc separates the hollow section 2b and the hollow section 2c. The rib 2cd separates the hollow section 2c and the hollow section 2d.

The left member 3 has hollow sections 3a, 3b, 3c extending in the front-back direction and ribs 3ab, 3bc. The hollow sections 3a, 3b, 3c are arranged from the right side to the left side. The rib 3ab separates the hollow section 3a and the hollow section 3b. The rib 3bc separates the hollow section 3b and the hollow section 3c.

The crash box 5 is attached to a front end of the body section 10 via a cross member 4. Thus, the crash box 5 is arranged in the front portion of the vehicle. The crash box 5 is a rectangular parallelepiped having a square cross section, for example.

The cross member 4 only has to be a rod-shaped body extending in the right-left direction. The cross member 4 is joined to front sides of the right member 1, the center member 2, and the left member 3 along weld lines W3, W6. The weld line W6 is located below the weld line W3, and overlaps the weld line W3 when seen from above the stack frame 100. An advancing direction of the weld line W6 is also the same as an advancing direction of the weld line W3 when seen from above the stack frame 100. The cross member 4 is preferably joined to the right member 1, the center member 2, and the left member 3 by using the welding method such as the FSW. Note that joining may be achieved in an order of the weld lines W1, W4, W2, W5, W3, and W6.

Any of the wide variety of the joint methods can be used to join the cross member 4 to the right member 1, the center member 2, and the left member 3. Examples of the other joint methods are the welding methods such as the laser welding and the arc welding.

In an example of the cross member 4 illustrated in FIG. 1, a right end 4a of the cross member 4 is preferably positioned at the rib 1ab or near the rib 1ab, and a left end 4b of the cross member 4 is preferably positioned at the rib 3bc or near the rib 3bc.

The crash box 5 is more likely to be deformed and absorb impact energy than the body section 10 when receiving an impact. The crash box 5 is a box-shaped body that includes a right wall surface 5a and a left wall surface 5b. A width L5 in the right-left direction of one example of the crash box 5 illustrated in FIG. 1 is less than a width L2 in the right-left direction of the center member 2. A length L4 in the right-left direction of the cross member 4 is greater than the width L5 in the right-left direction of the crash box 5 or the width L2 in the right-left direction of the center member 2.

When seen from front of the stack frame 100, the right wall surface 5a does not overlap an extended line W11 of the weld line W1. In other words, the right wall surface 5a is displaced from the extended line W11 of the weld line W1. In addition, when seen from the front of the stack frame 100, the rib 2ab preferably overlaps the right wall surface 5a of the crash box 5. That is, the right wall surface 5a is positioned on an extended line of the rib 2ab.

When seen from the front of the stack frame 100, the left wall surface 5b does not overlap an extended line W21 of the weld line W2. In other words, the left wall surface 5b is displaced from the extended line W21 of the weld line W2. In addition, when seen from the front of the stack frame 100, the rib 2cd preferably overlaps the left wall surface 5b of the crash box 5. That is, the left wall surface 5b is positioned on an extended line of the rib 2cd.

Here, the front side of the vehicle (not illustrated), in which the stack frame 100 is arranged, is involved in a collision. Consequently, the impact is applied to the stack frame 100 from the front of the stack frame 100. Then, a load F1 is applied to the crash box 5, and the crash box 5 is crashed. Thereafter, the load F1 is transferred from the crashed crash box 5 to the body section 10 via the cross member 4.

More specifically, a load F1a is transferred from the right wall surface 5a of the crash box 5 to the body section 10. Here, since the right wall surface 5a is displaced from the extended line W11 of the weld line W1, the load F1a is not transferred to the weld line W1 as is but is transferred to the center member 2. As a result, it is possible to suppress generation of damage on the weld line W1, that is, in a joint section of the right member 1 and the center member 2.

The right wall surface 5a of the crash box 5 according to this embodiment is positioned on the extended line of the rib 2ab. Thus, the load F1a is directly transferred to the rib 2ab. That is, the rib 2ab supports the load F1a. The rib 2ab tends to have superior impact durability to other portions of the center member 2. Thus, the rib 2ab is less likely to be damaged even when receiving the load F1a. Therefore, it is possible to suppress the generation of the damage to the center member 2 by the load F1a. That is, it is possible to further suppress the generation of the damage by the load F1.

Meanwhile, a load F1b is transferred from the left wall surface 5b of the crash box 5 to the body section 10. Here, since the left wall surface 5b is displaced from the extended line W21 of the weld line W2, the load F1b is not transferred to the weld line W2 as is but is transferred to the center member 2. As a result, it is possible to suppress the generation of the damage on the weld line W2, that is, in a joint section of the center member 2 and the left member 3.

The left wall surface 5b of the crash box 5 according to this embodiment is positioned on the extended line of the rib 2cd. Thus, the load F1b is directly transferred to the rib 2cd. That is, the rib 2cd supports the load F1b. The rib 2cd tends to have the superior impact durability to other portions of the center member 2. Thus, the rib 2cd is less likely to be damaged even when receiving the load F1b. Therefore, it is possible to suppress the generation of the damage to the center member 2 by the load F1b. That is, it is possible to further suppress the generation of the damage by the load F1.

The length L4 in the right-left direction of the cross member 4 is greater than the width L5 in the right-left direction of the crash box 5 and the width L2 in the right-left direction of the center member 2. Thus, the loads F1a, F1b are not respectively transferred to the weld lines W1, W2 as is but are transferred to the right member 1, the center member 2, and the left member 3 via the cross member 4. As a result, it is possible to suppress the generation of the damage on the weld lines W1, W2, that is, in the joint section of the right member 1 and the center member 2 and the joint section of the center member 2 and the left member 3.

As it has been described so far, according to the configuration of the stack frame 100, it is possible to suppress the generation of the damage by the load F1.

The right wall surface 5a of the crash box 5 according to this embodiment is positioned on the extended line of the rib 2ab, and the left wall surface 5b is positioned on the extended line of the rib 2cd. The length L4 of the cross member 4 according to this embodiment is greater than the width L5 of the crash box 5 and the width L2 of the center member 2. Therefore, it is possible to further suppress the generation of the damage by the load F1.

In addition, in the first embodiment described above, the fuel cell stack FC1 or the cell stack of the secondary battery can be mounted on the stack frame 100. The battery tends to have less mechanical strength than an internal combustion engine. Thus, the engine compartment on which the battery is mounted tends to have less mechanical strength than an engine compartment on which the internal combustion engine is mounted. As a result, as described above, it is possible to suppress the generation of the damage to the stack frame 100 while the impact is absorbed by the crash box 5. Therefore, the stack frame 100 is suitable as a frame on which the cell stack of the battery is mounted.

The stack frame 100 is formed by joining the plural members using the FSW. The joint section formed by the FSW tends to have less impact durability than bodies of the plural members. In addition, in the joint section formed by the FSW, a portion in which friction stir is initiated and a portion in which the friction stir is completed tend to have the less impact durability than the other portions. Thus, as described above, according to the configuration of the stack frame 100, it is possible to particularly suppress the generation of the damage to the joint section using the FSW. Therefore, the configuration of the stack frame 100 is preferred.

First Modified Embodiment

Figure 4:
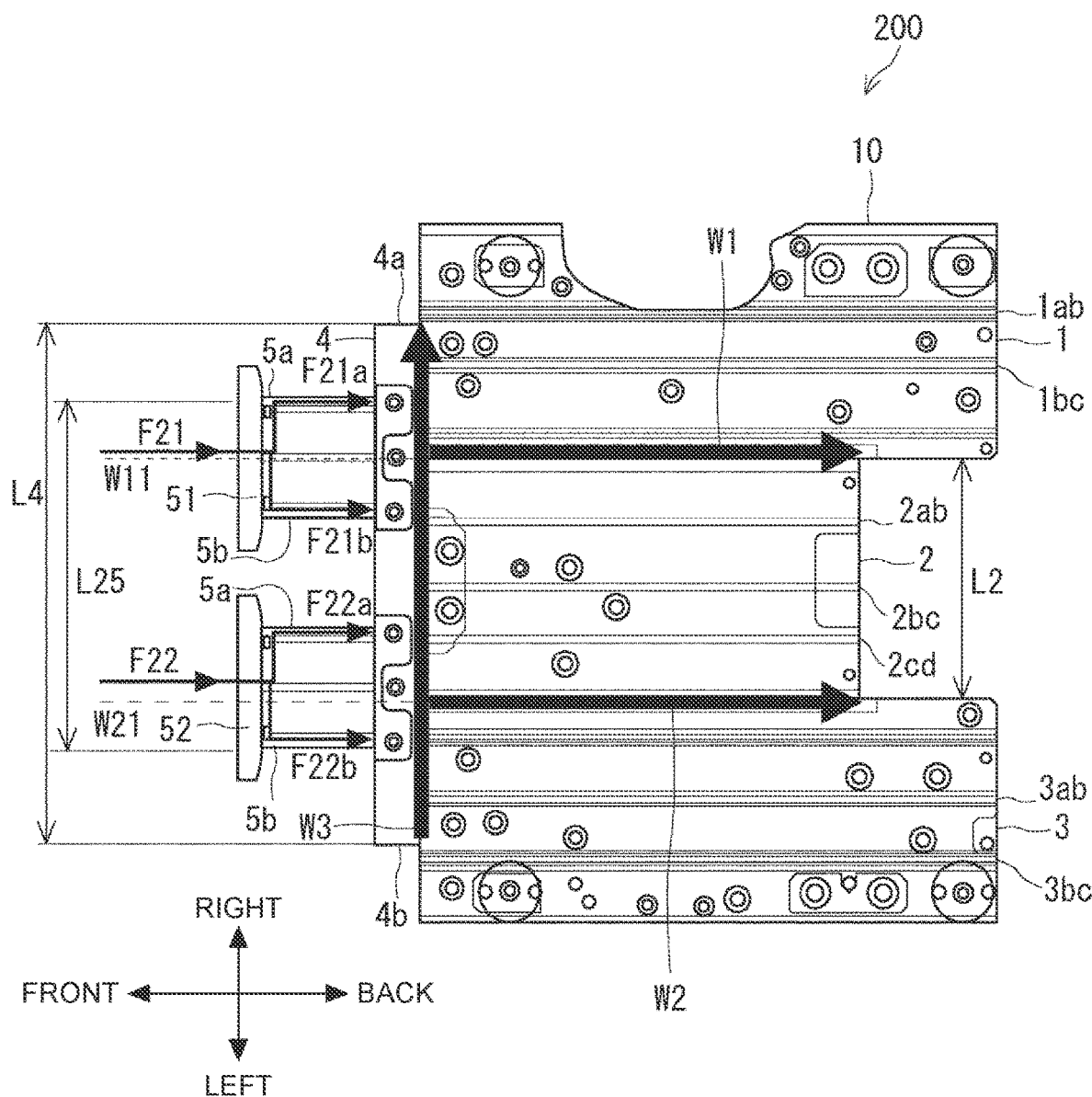
FIG. 4 is a top view of a modified embodiment of the stack frame according to the first embodiment.

FIG. 4 illustrates a stack frame 200. The stack frame 200 is a modified embodiment of the stack frame 100 illustrated in FIG. 1 to FIG. 3. Except for the crash box, the stack frame 200 has the same configuration as the stack frame 100.

The stack frame 200 includes crash boxes 51, 52. Each of the crash boxes 51, 52 has the same configuration as the crash box 5 illustrated in FIG. 1. A width L25 in the right-left direction of one example of the crash boxes 51, 52 illustrated in FIG. 4 is the same as the distance in the right-left direction from the right wall surface 5a of the crash box 51 to the left wall surface 5b of the crash box 52. The width L25 is greater than the width L2 in the right-left direction of the center member 2. In addition, the length L4 in the right-left direction of the cross member 4 is greater than the width L25 and the width L2 in the right-left direction of the center member 2.

When seen from the front of the stack frame 200, the right wall surface 5a and the left wall surface 5b of the crash box 51 do not overlap the extended line W11 of the weld line W1. In other words, the right wall surface 5a and the left wall surface 5b of the crash box 51 are displaced from the extended line W11 of the weld line W1. In addition, the extended line W11 of the weld line W1 is positioned between the right wall surface 5a and the left wall surface 5b of the crash box 51.

When seen from the front of the stack frame 200, the right wall surface 5a and the left wall surface 5b of the crash box 52 do not overlap the extended line W21 of the weld line W2. In other words, the right wall surface 5a and the left wall surface 5b of the crash box 52 are displaced from the extended line W21 of the weld line W2. In addition, the extended line W21 of the weld line W2 is positioned between the right wall surface 5a and the left wall surface 5b of the crash box 52.

Here, the front side of the vehicle (not illustrated), in which the stack frame 200 is arranged, is involved in the collision. Consequently, the impact is applied to the stack frame 200 from the front of the stack frame 200. Then, a load F21 is applied to the crash box 51, and the crash box 51 is crashed. Thereafter, the load F21 is transferred from the crashed crash box 51 to the body section 10 via the cross member 4. Similarly, a load F22 is applied to the crash box 52, and the crash box 52 is crashed. Thereafter, the load F22 is transferred from the crashed crash box 52 to the body section 10 via the cross member 4.

More specifically, a load F21a is transferred from the right wall surface 5a of the crash box 51 to the body section 10. Here, since the right wall surface 5a of the crash box 51 is displaced from the extended line W11 of the weld line W1, the load F21a is not transferred to the weld line W1 as is but is transferred to the right member 1. As a result, it is possible to suppress the generation of the damage on the weld line W1, that is, in the joint section of the right member 1 and the center member 2.

Similarly, a load F21b is transferred from the left wall surface 5b of the crash box 51 to the body section 10. Here, since the left wall surface 5b of the crash box 51 is displaced from the extended line W11 of the weld line W1, the load F21b is not transferred to the weld line W1 as is but is transferred to the center member 2. As a result, it is possible to suppress the generation of the damage on the weld line W1, that is, in the joint section of the right member 1 and the center member 2.

Similarly, a load F22a is transferred from the right wall surface 5a of the crash box 52 to the body section 10. Here, since the right wall surface 5a of the crash box 52 is displaced from the extended line W21 of the weld line W2, the load F22a is not transferred to the weld line W2 as is but is transferred to the center member 2. As a result, it is possible to suppress the generation of the damage on the weld line W2, that is, in the joint section of the center member 2 and the left member 3.

Similarly, a load F22b is transferred from the left wall surface 5b of the crash box 52 to the body section 10. Here, since the left wall surface 5b of the crash box 52 is displaced from the extended line W21 of the weld line W2, the load F22b is not transferred to the weld line W2 as is but is transferred to the left member 3. As a result, it is possible to suppress the generation of the damage on the weld line W2, that is, in the joint section of the center member 2 and the left member 3.

The length L4 of the cross member 4 according to this embodiment is greater than the width L25 and the width L2 of the center member 2. Thus, the loads F21a, F21b, F22a, F22b are not transferred to the weld lines W1, W2 as is but are transferred to the right member 1, the center member 2, and the left member 3 via the cross member 4. As a result, it is possible to suppress the generation of the damage on the weld lines W1, W2, that is, in the joint section of the right member 1 and the center member 2 and the joint section of the center member 2 and the left member 3.

As it has been described so far, according to the configuration of the stack frame 200, the damage by the loads F21, F22 is unlikely to be generated.

The length L4 of the cross member 4 according to this first modified embodiment is greater than the width L25 of the crash boxes 51, 52 and the width L2 of the center member 2. Therefore, it is possible to further suppress the generation of the damage by the loads F21, F22.

Second Modified Embodiment

FIG. 5 illustrates a stack frame 300. The stack frame 300 is a modified embodiment of the stack frame 100 illustrated in FIG. 1 to FIG. 3.

The stack frame 300 includes a body section 30 and a crash box 35.

The body section 30 includes a right member 31, a center member 32, and a left member 33. The body section 30 has the same width in the right-left direction as the body section 10 illustrated in FIG. 1. The right member 31 has the same configuration as the right member 1 illustrated in FIG. 1 except for having a greater width in the right-left direction than the right member 1. The left member 33 has the same configuration as the left member 3 illustrated in FIG. 1 except for having a greater width in the right-left direction than the left member 33. The center member 32 has the same configuration as the right member 1 illustrated in FIG. 1 except for a width L32 of the center member 32 in the right-left direction is less than the width L2 of the center member 2 illustrated in FIG. 1 and except for not having the hollow sections 2a, 2d.

The crash box 35 has the same configuration as the crash box 5 illustrated in FIG. 1 except for a width L35 in the right-left direction. The width L35 is greater than the width L5 in the right-left direction of the crash box 5 and the width L32 of the center member 32. In addition, the length L4 in the right-left direction of the cross member 4 is greater than the width L35 and the width L32.

Here, the front side of the vehicle (not illustrated), in which the stack frame 300 is arranged, is involved in the collision. Consequently, the impact is applied to the stack frame 300 from the front of the stack frame 300. Then, a load F3 is applied to the crash box 35, and the crash box 35 is crashed. Thereafter, the load F3 is transferred from the crashed crash box 35 to the body section 30 via the cross member 4.

More specifically, a load F3a is transferred from the right wall surface 5a of the crash box 35 to the body section 30. Here, since the right wall surface 5a of the crash box 35 is displaced from the extended line W11 of the weld line W1, the load F3a is not transferred to the weld line W1 as is but is transferred to the right member 31. As a result, it is possible to suppress the generation of the damage on the weld line W1, that is, in a joint section of the right member 31 and the center member 32.

Meanwhile, a load F3b is transferred from the left wall surface 5b of the crash box 35 to the body section 30. Here, since the left wall surface 5b of the crash box 35 is displaced from the extended line W21 of the weld line W2, the load F3b is not transferred to the weld line W2 as is but is transferred to the left member 33. As a result, it is possible to suppress the generation of the damage on the weld line W2, that is, in a joint section of the center member 32 and the left member 33.

The length L4 in the right-left direction of the cross member 4 is greater than the width L35 in the right-left direction of the crash box 35 and the width L32 in the right-left direction of the center member 32. Thus, the loads F3a, F3b are not respectively transferred to the weld lines W1, W2 as is but are transferred to the right member 31, the center member 32, and the left member 33 via the cross member 4. As a result, it is possible to suppress the generation of the damage on the weld lines W1, W2, that is, in the joint section of the right member 31 and the center member 32 and the joint section of the center member 32 and the left member 33.

As it has been described so far, according to the configuration of the stack frame 300, the damage by the loads F3 is unlikely to be generated.

The length L4 of the cross member 4 according to this embodiment is greater than the width L35 of the crash box 35 and the width L32 of the center member 32. Therefore, it is possible to further suppress the generation of the damage by the load F3.

It should be noted that the disclosure is not limited to the above embodiment and can appropriately be modified within the scope that does not depart from the gist of the disclosure. For example, the body section 10 includes three of the plural members that are welded to each other along the weld lines. However, the body section 10 may include two, four, or more of the plural members. The weld lines between these plural members may extend in the front-back direction of the vehicle.

What is claimed is:

1. A stack frame that is arranged in a front portion of a vehicle and on which a battery stack is mounted, the stack frame comprising:
    a body section; and
    a crash box, wherein
    the body section includes plural members that are welded to each other along a weld line,
    the weld line between the plural members extends in a front-back direction of the vehicle,
    the crash box is arranged on a front side of the body section, and
    a lateral wall surface of the crash box is displaced from an extended line of the weld line.

2. The stack frame according to claim 1, wherein
    at least one of the plural members of the body section includes: plural hollow sections, each of which extends in the front-back direction of the vehicle; and a rib that separates the plural hollow sections and extends in the front-back direction of the vehicle, and the lateral wall surface of the crash box is provided on an extended line of the rib.

3. The stack frame according to claim 1 further comprising:

a cross member that is arranged between the body section and the crash box, wherein a width of the cross member is greater than a distance between the adjacent weld lines and a width of the crash box.

\* \* \* \* \*